United States Patent
Tran et al.

(10) Patent No.: US 8,166,631 B1
(45) Date of Patent: May 1, 2012

(54) METHOD FOR FABRICATING A MAGNETIC RECORDING TRANSDUCER HAVING SIDE SHIELDS

(75) Inventors: Ut Tran, San Jose, CA (US); Zhigang Bai, Milpitas, CA (US); Kevin K. Lin, San Ramon, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 673 days.

(21) Appl. No.: 12/199,624

(22) Filed: Aug. 27, 2008

(51) Int. Cl.
*G11B 5/17* (2006.01)
*H04R 31/00* (2006.01)

(52) U.S. Cl. ............... 29/603.14; 29/603.13; 29/603.15; 29/603.16; 29/603.18; 216/22; 216/39; 216/41; 216/48; 216/65; 360/121; 360/122; 360/317; 427/127; 427/128

(58) Field of Classification Search ............... 29/603.11, 29/603.12–603.16, 603.18; 216/22, 39, 41, 216/48, 65; 360/121, 122, 317; 451/5, 41
See application file for complete search history.

(56) References Cited

U.S. PATENT DOCUMENTS

| | | |
|---|---|---|
| 6,497,825 B1 | 12/2002 | Kamijima |
| 6,943,993 B2 | 9/2005 | Chang et al. |
| 6,949,833 B2 | 9/2005 | O'Kane et al. |
| 6,954,340 B2 | 10/2005 | Shukh et al. |
| 6,975,486 B2 | 12/2005 | Chen et al. |
| 6,980,403 B2 | 12/2005 | Hasegawa |
| 7,024,756 B2 | 4/2006 | Le et al. |
| 7,042,682 B2 | 5/2006 | Hu et al. |
| 7,067,066 B2 | 6/2006 | Sasaki et al. |
| 7,070,698 B2 | 7/2006 | Le |
| 7,075,756 B1 | 7/2006 | Mallary et al. |
| 7,124,498 B2 | 10/2006 | Sato |
| 7,193,815 B1 | 3/2007 | Stoev et al. |
| 7,239,479 B2 | 7/2007 | Sasaki et al. |
| 7,295,401 B2 | 11/2007 | Jayasekara et al. |
| 7,296,339 B1 | 11/2007 | Yang et al. |
| 7,322,095 B2 | 1/2008 | Guan et al. |
| 7,337,530 B1 | 3/2008 | Stoev et al. |
| 7,444,740 B1 | 11/2008 | Chung et al. |
| 7,508,627 B1 | 3/2009 | Zhang et al. |
| 7,587,811 B2 | 9/2009 | Balamane et al. |
| 8,015,692 B1 | 9/2011 | Zhang et al. |
| 2002/0071208 A1 | 6/2002 | Batra et al. |
| 2004/0032692 A1 | 2/2004 | Kobayashi |
| 2004/0156148 A1 | 8/2004 | Chang et al. |

(Continued)

OTHER PUBLICATIONS

Mallary et al., "One Terabit per Square Inch Perpendicular Recording Conceptual Design", IEEE Transactions on Magnetics, vol. 38, No. 4, pp. 1719-1724, Jul. 2002.

*Primary Examiner* — Paul D Kim

(57) ABSTRACT

A method provides a magnetic transducer that includes an underlayer and a nonmagnetic layer on the underlayer. The method includes providing a plurality of trenches in the nonmagnetic layer. A first trench of corresponds to a main pole, while at least one side trench corresponds to at least one side shield. The method also includes providing mask covering the side trench(es) and providing the main pole. At least a portion of the main pole resides in the first trench. The method also includes removing at least a portion of the nonmagnetic layer residing between the side trench(es) and the main pole. The method also includes providing at least one side shield. The shield(s) extend from at least an air-bearing surface location to not further than a coil front location.

16 Claims, 16 Drawing Sheets

U.S. PATENT DOCUMENTS

| | | |
|---|---|---|
| 2005/0057852 A1* | 3/2005 | Yazawa et al. .............. 360/125 |
| 2005/0068669 A1 | 3/2005 | Hsu et al. |
| 2006/0044681 A1 | 3/2006 | Le et al. |
| 2006/0044682 A1 | 3/2006 | Le et al. |
| 2006/0082924 A1 | 4/2006 | Etoh et al. |
| 2006/0098334 A1 | 5/2006 | Jayasekara et al. |
| 2006/0198049 A1 | 9/2006 | Sasaki et al. |
| 2007/0035878 A1 | 2/2007 | Guthrie et al. |
| 2007/0035885 A1 | 2/2007 | Im et al. |
| 2007/0115584 A1 | 5/2007 | Balamane et al. |
| 2007/0146929 A1 | 6/2007 | Maruyama et al. |
| 2007/0146931 A1 | 6/2007 | Baer et al. |
| 2007/0177301 A1 | 8/2007 | Han et al. |
| 2007/0186408 A1 | 8/2007 | Nix et al. |
| 2007/0211384 A1 | 9/2007 | Hsiao et al. |
| 2007/0217069 A1 | 9/2007 | Okada et al. |
| 2007/0245545 A1 | 10/2007 | Pentek et al. |
| 2007/0247749 A1 | 10/2007 | Bonhote et al. |
| 2007/0253107 A1 | 11/2007 | Mochizuki et al. |
| 2007/0258167 A1 | 11/2007 | Allen et al. |
| 2007/0263324 A1 | 11/2007 | Allen et al. |
| 2007/0268626 A1 | 11/2007 | Taguchi et al. |
| 2007/0268627 A1 | 11/2007 | Le et al. |
| 2008/0113090 A1 | 5/2008 | Lam et al. |
| 2008/0113514 A1 | 5/2008 | Baer et al. |
| 2008/0253035 A1* | 10/2008 | Han et al. ................. 360/319 |
| 2008/0297945 A1 | 12/2008 | Han et al. |
| 2009/0002885 A1* | 1/2009 | Sin .......................... 360/125.02 |
| 2009/0109570 A1 | 4/2009 | Scholz et al. |
| 2009/0168236 A1* | 7/2009 | Jiang et al. ................ 360/110 |
| 2010/0061016 A1 | 3/2010 | Han et al. |

\* cited by examiner

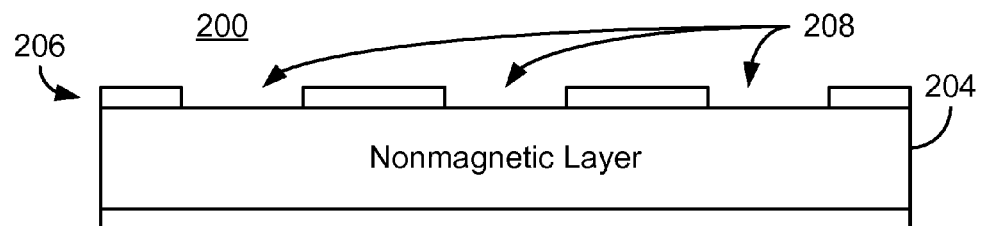
FIG. 8
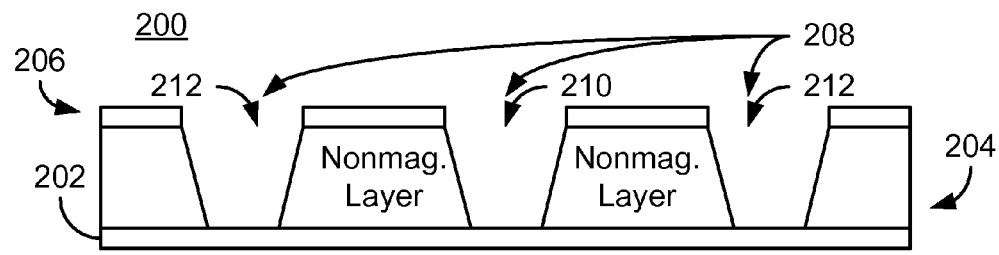
ABS View
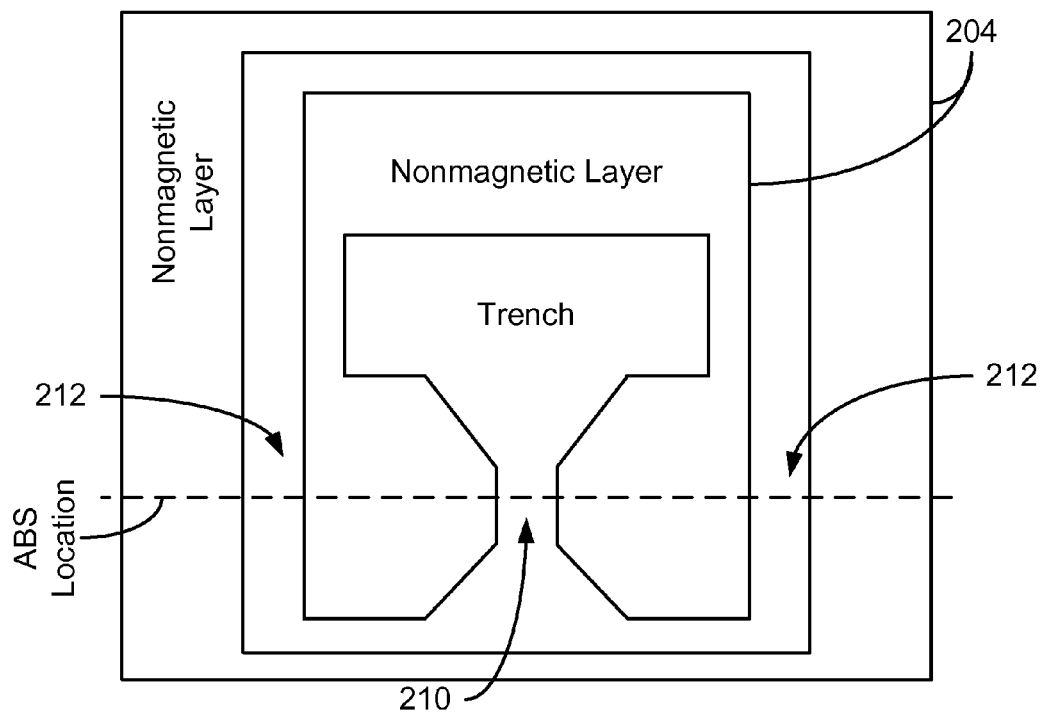
Plan View
FIG. 9

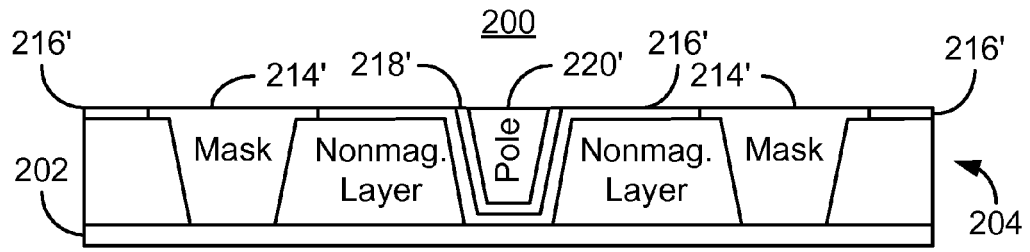
FIG. 14
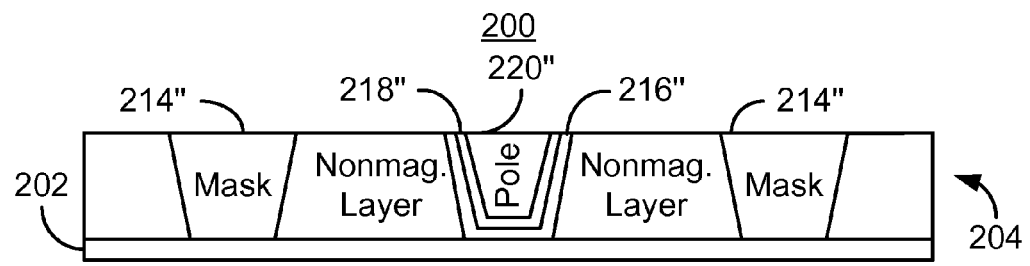
ABS View
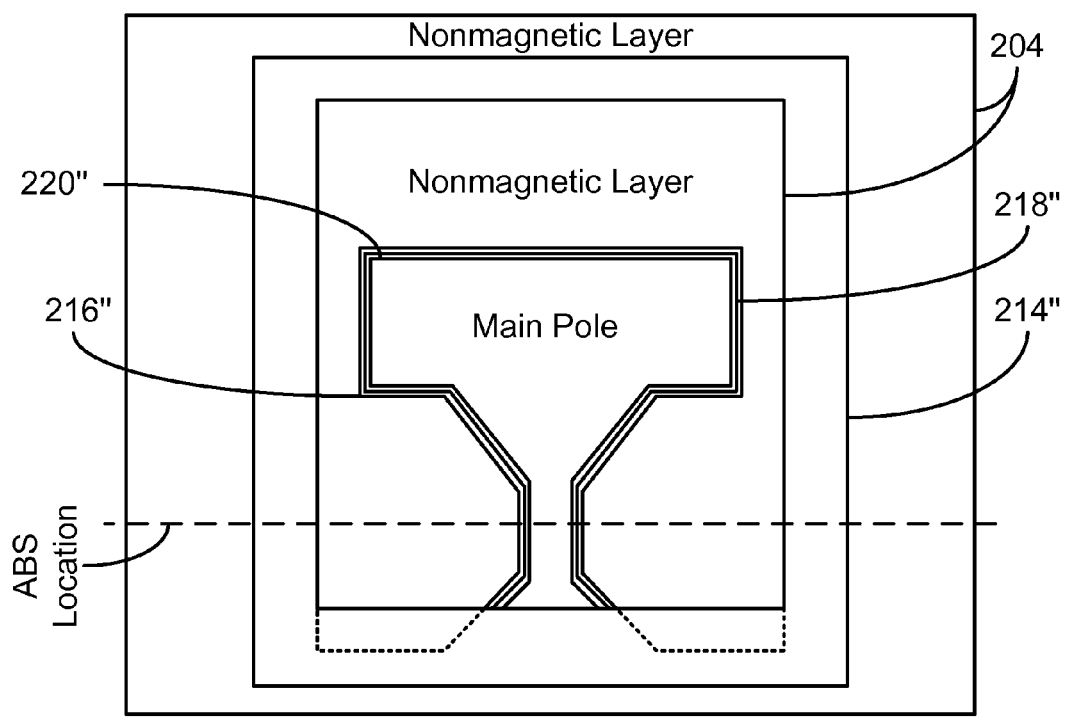
Plan View
FIG. 15

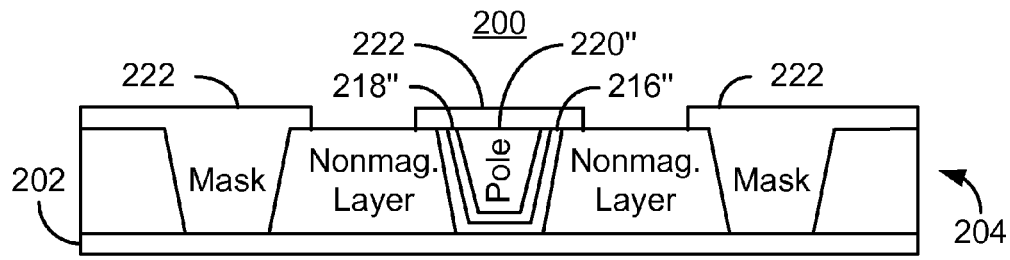
FIG. 16
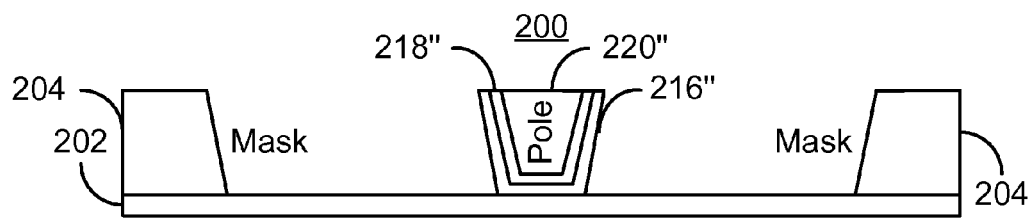
ABS View
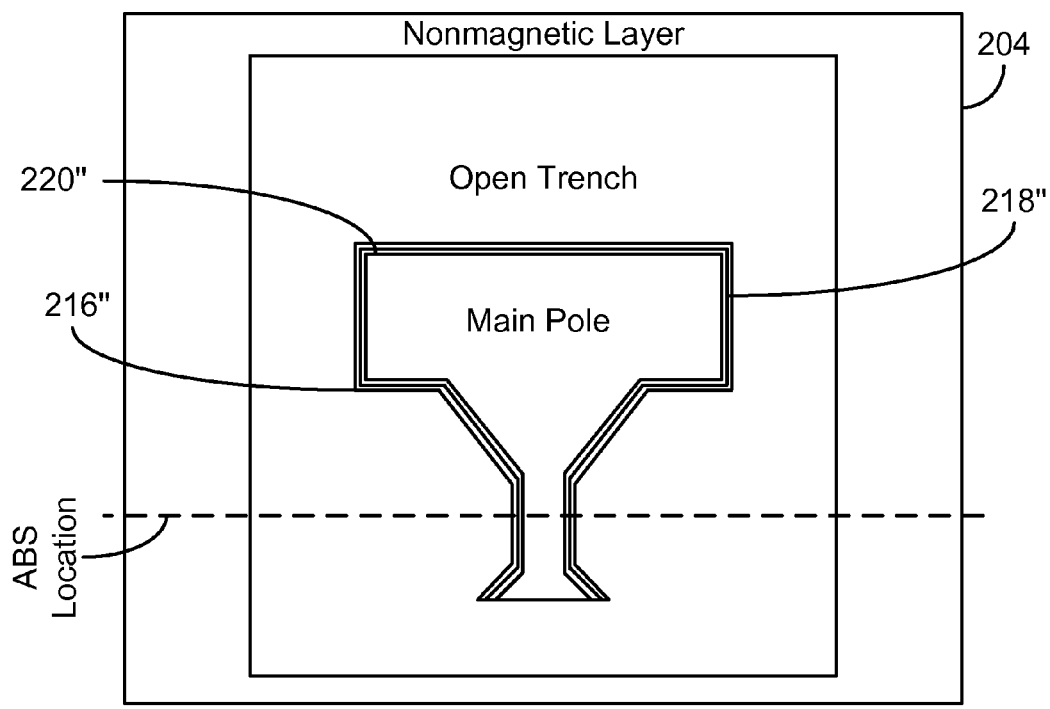
Plan View
FIG. 17

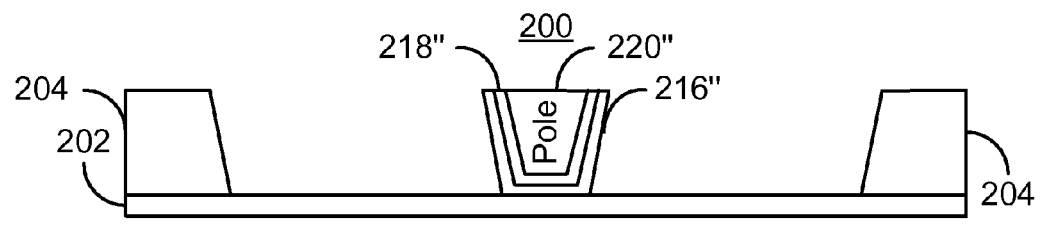
ABS View
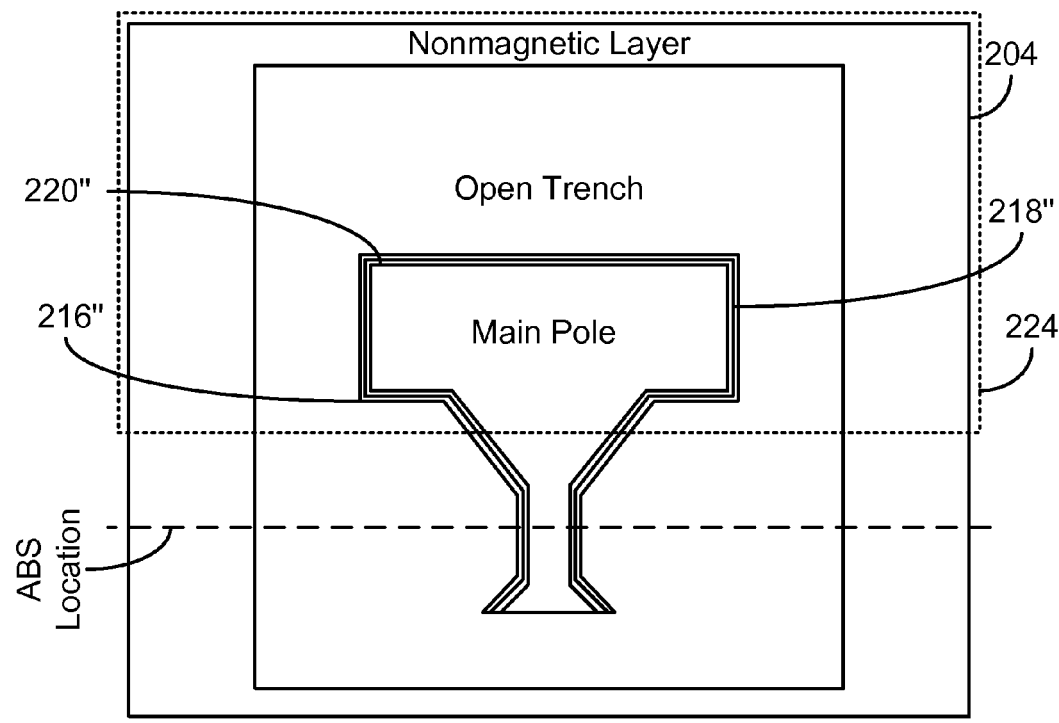
Plan View
FIG. 18

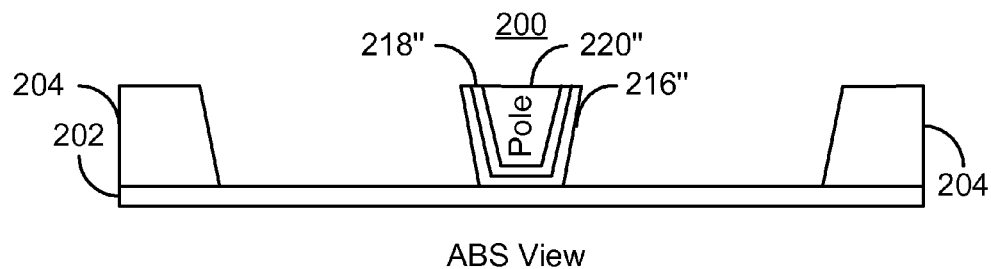
ABS View
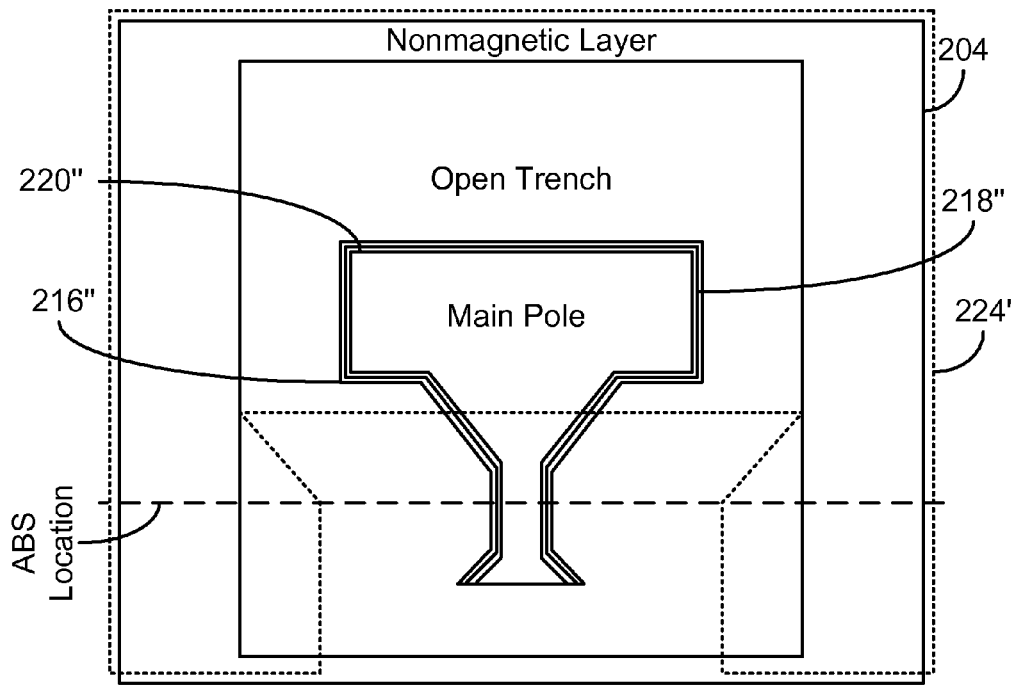
Plan View
FIG. 19
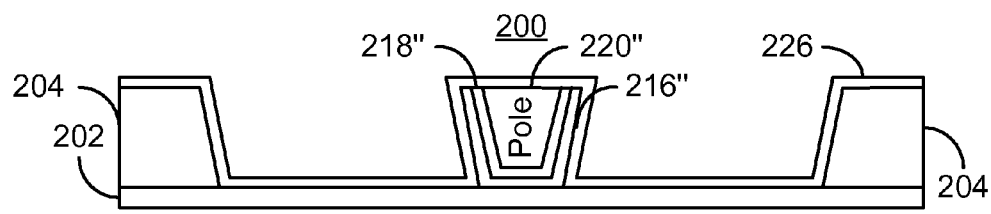
FIG. 20

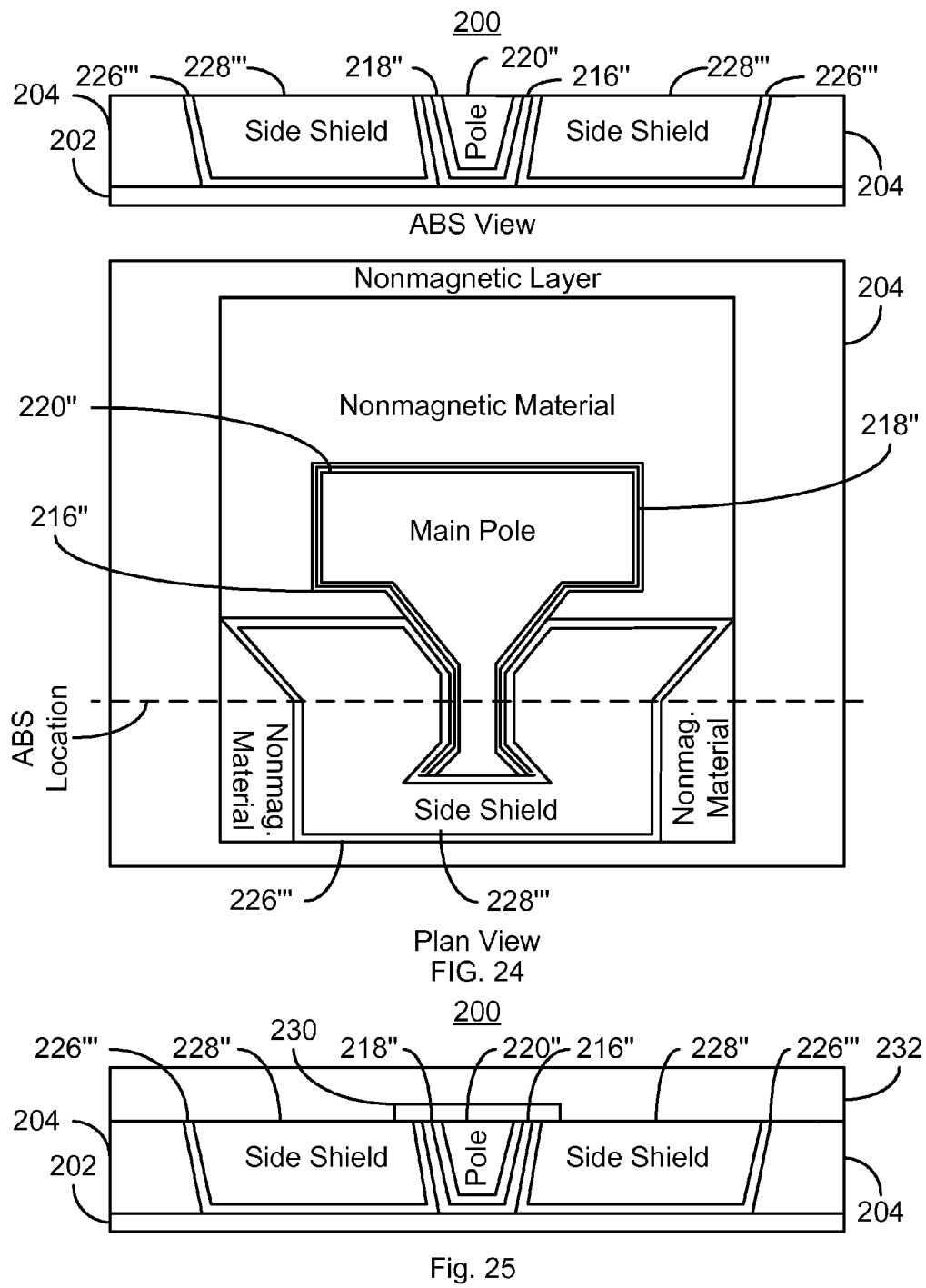

METHOD FOR FABRICATING A MAGNETIC RECORDING TRANSDUCER HAVING SIDE SHIELDS

BACKGROUND

Side shields, as well as top shields may be desired in conventional magnetic recording transducers, particular perpendicular magnetic recording (PMR) transducers. Side shields in combination with top shields that surround the sides and top of the main PMR pole are termed wrap-around shields. FIG. 1 depicts a conventional method 10 for fabricating such a conventional PMR transducer having a wrap-around shield. The method 10 allows fabrication of the side shields without requiring the main pole to be trimmed.

The conventional method 10 commences by blanket depositing a magnetic material used for the conventional side shield, via step 12. Step 12 includes plating a NiFe layer. A trench for the conventional main pole is formed in the NiFe layer, via step 14. The trench for the conventional main pole has a reverse angle. Thus, the top of the trench is wider than the bottom of the trench. The trench is formed in step 14 by performing a NiFe reactive ion etch (RIE). A nonmagnetic layer is then deposited in the trench, via step 16. The nonmagnetic layer is used to form a side gap between the side shield and the conventional main pole. The conventional main pole may then be provided on the nonmagnetic layer, via step 18. Typically, step 18 includes depositing the material for the conventional main pole followed by a planarization, such as a chemical mechanical planarization (CMP). Fabrication of the conventional transducer may then be completed. For example, a write gap, top shield, coils, and other components may be fabricated.

FIG. 2 depicts air-bearing surface (ABS) and side views of a conventional, magnetic transducer 50. For clarity, FIG. 2 is not drawn to scale and only certain structures are depicted. The conventional transducer 50 includes a conventional side shield 52, a conventional nonmagnetic layer 54, and a conventional main pole 56. The conventional nonmagnetic layer 54 separates the conventional main pole 56 from the conventional side shield 52. Also shown are a write gap 58 and conventional top shield 60. Conventional coils 62 are depicted by dotted lines in the plan view of the conventional transducer 50.

Although the conventional method 10 allows the conventional transducer 50 to be fabricated, there are several drawbacks. The NiFe RIE performed in step 14 may be difficult to control. In particular, forming a trench having the desired reverse angle and other features may be problematic. The conventional side shield 52 also surrounds the conventional main pole 56. As a result, it may be difficult to separately control the geometry of the conventional side shield 52 and the geometry of the conventional main pole 56. In addition, because of the location of the coils 62, the conventional side shield 52 may be at least partially driven by the current through the coils 62. As a result, performance of the conventional side shield 52 may suffer.

Accordingly, what is needed is a system and method for improving the fabrication of a magnetic recording head having side shields.

BRIEF SUMMARY OF THE INVENTION

A method and system provide a magnetic transducer that includes an underlayer and a nonmagnetic layer on the underlayer. The method and system include providing a plurality of trenches in the nonmagnetic layer. A first trench of corresponds to a main pole, while at least one side trench corresponds to at least one side shield. The method and system also include providing mask covering the side trench(es) and providing the main pole. At least a portion of the main pole resides in the first trench. The method and system also includes removing at least a portion of the nonmagnetic layer residing between the side trench(es) and the main pole. The method and system also include providing at least one side shield. The shield(s) extend from at least an air-bearing surface location to not further than a coil front location.

BRIEF DESCRIPTION OF SEVERAL VIEWS OF THE DRAWINGS

FIGS. 8-28 depict exemplary embodiments of magnetic recording transducers during fabrication.

DETAILED DESCRIPTION OF THE PREFERRED EMBODIMENTS

Figure 1:
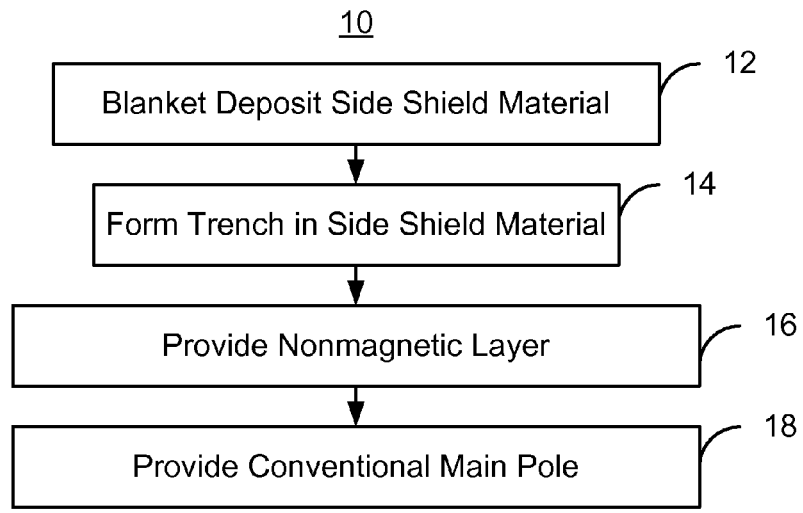
FIG. 1 is a flow chart depicting a conventional method for fabricating a magnetic recording transducer.
Figure 2:
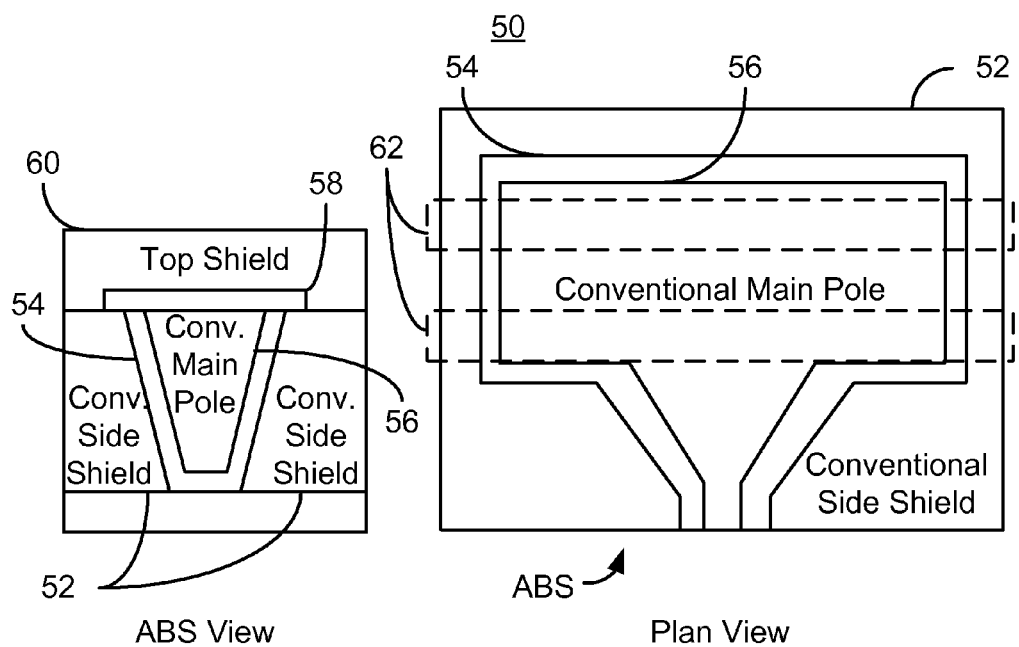
FIG. 2 depicts plan and ABS views of a conventional magnetic recording head.
Figure 3:
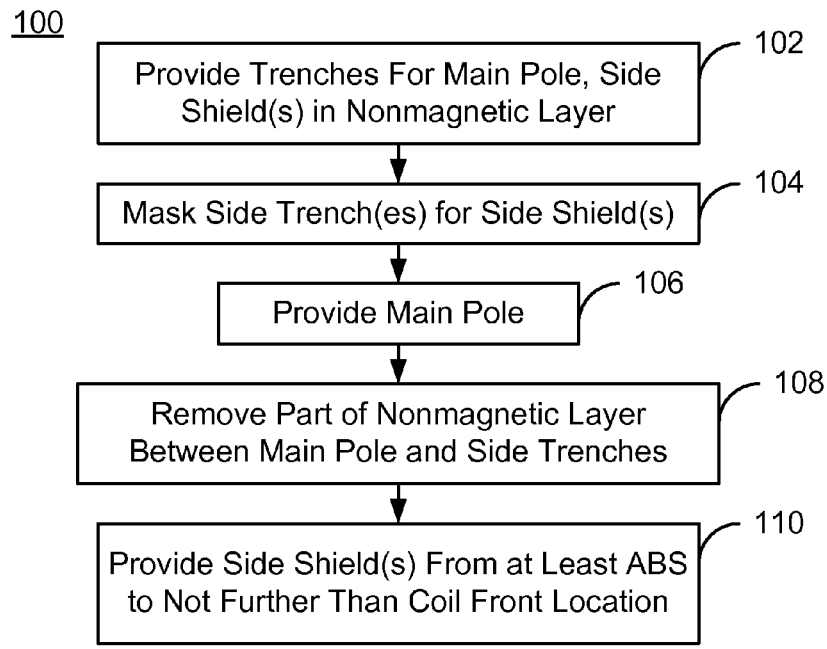
FIG. 3 is a flow chart depicting an exemplary embodiment of a method for fabricating a magnetic recording transducer having side shields.

FIG. 3 is an exemplary embodiment of a method 100 for providing magnetic recording transducer having side shields. For simplicity, some steps may be omitted. The method 100 is also described in the context of providing a single recording transducer. However, the method 100 may be used to fabricate multiple transducers at substantially the same time. The method 100 is also described in the context of particular layers. A particular layer may include multiple materials and/or multiple sublayers. The method 100 also may start after formation of other portions of the magnetic recording transducer. For example, the method 100 commences after formation of an underlayer and a nonmagnetic layer on the underlayer. The underlayer is nonmagnetic and may be an RIE stop layer. In one embodiment, the nonmagnetic layer is an insulator, such as aluminum oxide.

Trenches are provided in the nonmagnetic layer, via step 102. A first, central trench corresponds to the main pole that is to be formed. One or more side trench(es) correspond to the side shield(s) are also provided. In one embodiment, the sides of the side trenches that are farther from the first, central correspond to the locations of the outer edges of the side shield(s) to be formed. In one embodiment, step 102 includes providing a mask having apertures corresponding to the locations of the trenches. Portions of the nonmagnetic layer may then be removed to form the trenches. The removal may use a RIE, such as an aluminum oxide RIE. In such an embodiment, the underlayer may form the bottom of the trenches because the underlayer may be a RIE stop layer. The mask used to form the trenches may then be removed.

A mask that covers the side trench(es) is provided, via step 104. The mask preserves the location and shape of the side trench(es) and thus the side shield(s). In one embodiment, the mask provided is a photoresist mask that is patterned and cured. A main pole is provided, via step 106. In one embodiment, at least a portion of the main pole resides in the first trench. Step 106 may include depositing nonmagnetic material(s) prior to the main pole. The nonmagnetic material(s) may include layer(s) used to adjust the track width of the main pole and/or planarization stop layer(s), such as Ru. Step 106 may also include blanket depositing the magnetic materials, as well as any seed layers, and performing a planarization. Finally, the main pole provided in step 106 may include one or more bevels. For example, the main pole may include no bevel, a bottom bevel, a top bevel, or both.

At least a portion of the nonmagnetic layer residing between the side trench(es) and the main pole is removed, via step 108. Step 108 may include masking the main pole. In one embodiment, step 108 is accomplished via a wet etch. In such an embodiment, the nonmagnetic layer(s) provided in step 106 may protect the sides of the main pole from the etchant. In addition, a mask protecting the main pole may be made sufficiently wide that although the main pole is protected, at least part of the nonmagnetic layer between the main pole and the mask for the side trench(es) is removed.

The side shield(s) may then be provided, via step 110. The side shields are provided such that the side shield(s) extend from at least an ABS location to not further than a coil front location. An ABS location is the region which will become the ABS, for example by lapping another part down to the ABS location or by some other means. The coil front location is the location closest to the ABS location that any coil used in driving the main pole extends. Step 110 may include removing the mask covering the side trenches. In addition, a portion of the magnetic recording transducer distal from the ABS may be masked using a side shield mask. The material(s) for the side shield may then be deposited. After deposition of the side shield material(s), the transducer may also be planarized as part of step 110. As a result, the side shields have the desired location. Fabrication of the magnetic transducer may then be completed. For example, a write gap, top shield, and coils may be fabricated.

Figure 4:
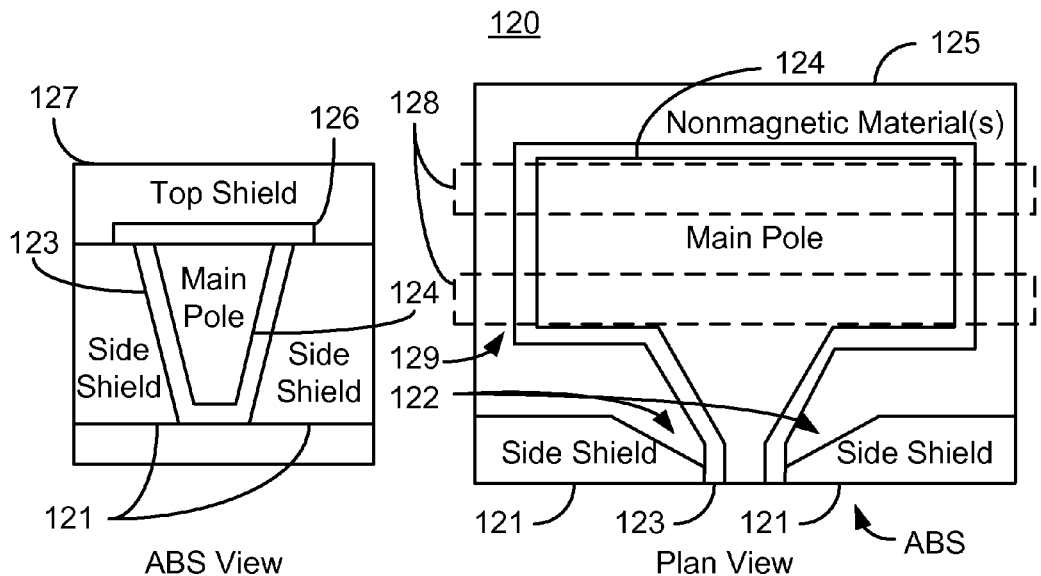
FIG. 4 depicts plan and ABS views of an exemplary embodiment of a magnetic recording transducer having side shields.

FIG. 4 depicts plan and ABS views of an exemplary embodiment of a magnetic recording transducer 120 having side shields and formed using the method 100. The transducer 120 may be part of a head including a slider and which is part of a disk drive. The magnetic transducer 120 includes nonmagnetic material(s), such as aluminum oxide, in which the trenches are formed in step 102. The magnetic transducer 120 includes side shields 121 and main pole 124 formed in steps 106 and 110. In addition, because of step 108, the nonmagnetic material(s) 125 have been removed from the ABS and thus are not shown in the ABS view. Also shown are nonmagnetic layers 123 that may be provided in step 106 and used to isolate the main pole 124 from the side shields 121 as well as to adjust the track width of the main pole 124. The transducer 120 also includes write gap 126, top shield 127, and coils 128. Although two coils 128 are shown, in another embodiment, another number of coils and/or turns per coil may be provided. As can be seen in FIG. 4, the side shields 121 and top shield 127 may meet, forming a wrap-around shield for the magnetic transducer 120. However, in another embodiment, the write gap 126 might be extended so that the top shield 127 is separated from the side shields 121. Further, the bottom of the main pole 124 is not closer to the underlayer than the side shields 121. Thus, the bottom of the main pole 124 is at the same height or higher than the bottom of the side shields 121.

Further, although not shown in FIG. 4, the outer edges of the side shields 121 may have a reverse angle that is substantially the same as the main pole 124. This is because the trench for the main pole 124 and side trench(es) for the side shields 121 may be formed concurrently.

Figure 5:
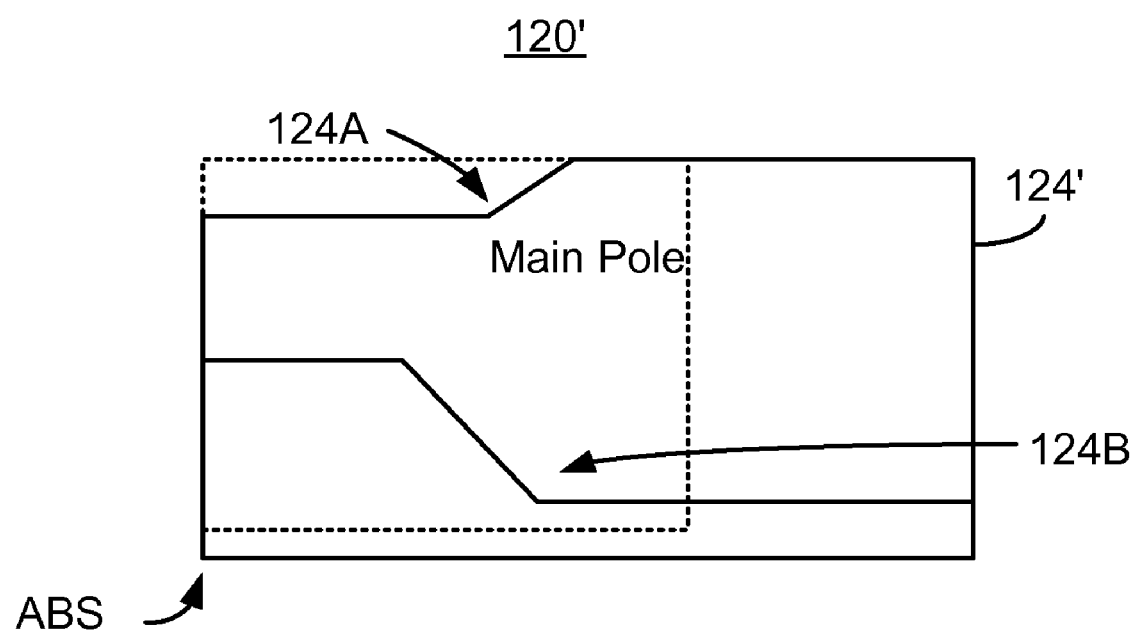
FIG. 5 depicts a side view of an exemplary embodiment of a magnetic recording transducer having side shields.

In addition, FIG. 5 depicts a side view of an exemplary embodiment of the transducer 120' in which the main pole 124' include bevels. Portions of the transducer 120' are analogous to the transducer 120 and are, therefore, labeled similarly. For clarity, the coils 128 are not shown. The side shields 121' are shown in dotted lines. As shown in FIG. 5, the main pole 124' includes bevels 124A and 124B. Bevel 124A is a bottom bevel, while bevel 124B is a top bevel. In other embodiments, the main pole 12' could include only the bottom bevel 124B or only the top bevel 124A.

Using the method 100, the transducer 120 may be formed. As a result, side shields 121 that extend from the ABS to not past the coil front location 129 are provided. In one embodiment, the side shields 121 extend at least fifty nanometers and not more than 1.5 micrometers from the ABS. In another embodiment, the side shields extend not more than 0.9 micrometers from the ABS. In another embodiment, the side shields 121 may extend less than fifty nanometers from the ABS, for example, to the nose length or less. In the embodiment shown, the side shields 121 terminate well before the coils 128/coil front location 129. As a result, coils 128 used to drive the main pole 124 may be decoupled from the side shields 121. Consequently, performance of the transducer 120 may be improved. Further, the geometry of the side shields 121 may be separately tailored. In particular, canted corners 122 may be formed. In addition, other geometries may also be fabricated. Thus, the method 100 also improves the flexibility of fabrication of the transducer 120. Further, because the main pole 124 is formed in a trench in the nonmagnetic materials 125, fabrication of the transducer 120 is more robust. Consequently, manufacturability of the transducer 120 may be improved. In addition, because the side shields 121 may extend below the bottom of the main pole 124, the ability of the side shields 121 to reduce adjacent track writing by the main pole 124, particularly at a skew angle, may be improved.

FIG. 5 is a flow chart depicting another exemplary embodiment of a method 130 for fabricating a magnetic recording transducer having side shields. For simplicity, some steps may be omitted. The method 130 is also described in the context of providing a single recording transducer. However, the method 130 may be used to fabricate multiple transducers and/or multiple poles at substantially the same time. The method 130 is also described in the context of particular layers. A particular layer may include multiple materials and/or multiple sublayers. The method 130 also may start after formation of other portions of the magnetic recording transducer. For example, the method 130 commences after formation of an underlayer and a nonmagnetic layer on the underlayer. The underlayer is nonmagnetic and may be an RIE stop layer. In one embodiment, the nonmagnetic layer is an insulator, such as aluminum oxide.

Trenches are provided in the nonmagnetic layer, via step 132. Step 132 is analogous to step 102. In one embodiment, three trenches are provided at the ABS location. A first, central trench corresponds to the main pole that is to be formed. Two side trenches correspond to the side shields being provided. In one embodiment, the sides of the side trenches that are farther from the first, central trench mark the locations of the outer edges of the side shields to be formed. In one embodiment, step 132 includes providing a mask having apertures corresponding to the locations of the trenches. Portions of the nonmagnetic layer may then be removed using a RIE, such as an aluminum oxide RIE. In such an embodiment, the underlayer may form the bottom of the trenches because the underlayer may be a RIE stop layer. The mask used to form the trenches may then be removed.

A mask is provided in step 134. Step 134 corresponds to step 104. At least a portion of the mask covers the side trenches. The mask preserves the location and shape of the side trench(es) and thus the side shield(s). In one embodiment, the mask provided is a photoresist mask that is patterned and cured.

A main pole is provided, via step 136. In one embodiment, at least a portion of the main pole resides in the first trench. Step 136 may include depositing nonmagnetic material(s) prior to the main pole. The nonmagnetic material(s) may include layer(s) used to adjust the track width of the main pole and/or planarization stop layer(s). The track width adjustment layer may include aluminum oxide that may be deposited using atomic layer deposition (ALD). The planarization stop layer(s) may include Ru. In one such embodiment, the Ru may also be used to adjust the track width of the main pole. Step 136 may also include blanket depositing the magnetic materials for the main pole, as well as any seed layers, and performing a planarization. Finally, the main pole provided in step 136 may include one or more bevels. For example, the main pole may include no bevel, a bottom bevel, a top bevel, or both. In such an embodiment, the top bevel may be provided by removing a portion of the magnetic materials in proximity to the ABS. The bottom bevel may be provided by removing a portion of the bottom of the first, central trench formed in step 132 distal from the ABS. In an alternate embodiment, a bottom bevel may be provided by filling of the first trench in proximity to the ABS using the nonmagnetic layer(s). In another embodiment, the top and/or bottom bevels may be formed in another manner.

At least a portion of the nonmagnetic layer residing between the side trench(es) and the main pole is removed, via step 138. In one embodiment, step 138 is accomplished via a wet etch. In such an embodiment, the nonmagnetic layer(s) provided in step 136 may protect the sides of the main pole from the etchant. In addition, a mask protecting the main pole may be made sufficiently wide that although the main pole is protected, at least part of the nonmagnetic layer between the main pole and the mask for the trenches is exposed to the etchant.

At least the portion of the mask that covers the side trenches is removed, via step 140. Thus, the edges of the nonmagnetic layer that correspond to the outside edges of the side shields are exposed. A planarization stop layer is provided, via step 142. A portion of the planarization stop layer covers the main pole, an exposed portion of the underlayer, and an exposed portion of the nonmagnetic layer. Thus, at least a portion of the planarization stop layer resides under the side shields. A side shield mask is provided, via step 144. The side shield mask extends from at least a coil front location distal from the ABS location. Thus, only a portion of the magnetic transducer that will be from the coil front location to at least the ABS is uncovered. At least one side shield material is then deposited, via step 146. The magnetic recording transducer is planarized, via step 148. The planarization may be terminated before the planarization stop layer provided in step 142 is removed. Thus, a portion of the side shield material(s) that is elevated, for example by the side shield mask, is removed. Consequently, the side shields may be provided. Fabrication of the magnetic transducer may then be completed. For example, a write gap, top shield, and coils may be fabricated.

Using the method 130, a transducer, such as the transducer 120, may be formed. As a result, side shields that extend from the ABS to not past the coil front location are provided. The geometry of these side shields may also be separately tailored. Further, because the main pole 124 is formed in a trench in the nonmagnetic materials, fabrication of the transducer is more robust. The side shields may also improve adjacent track writing issues. Consequently, performance and fabrication of the transducer may be improved.

Figure 6:
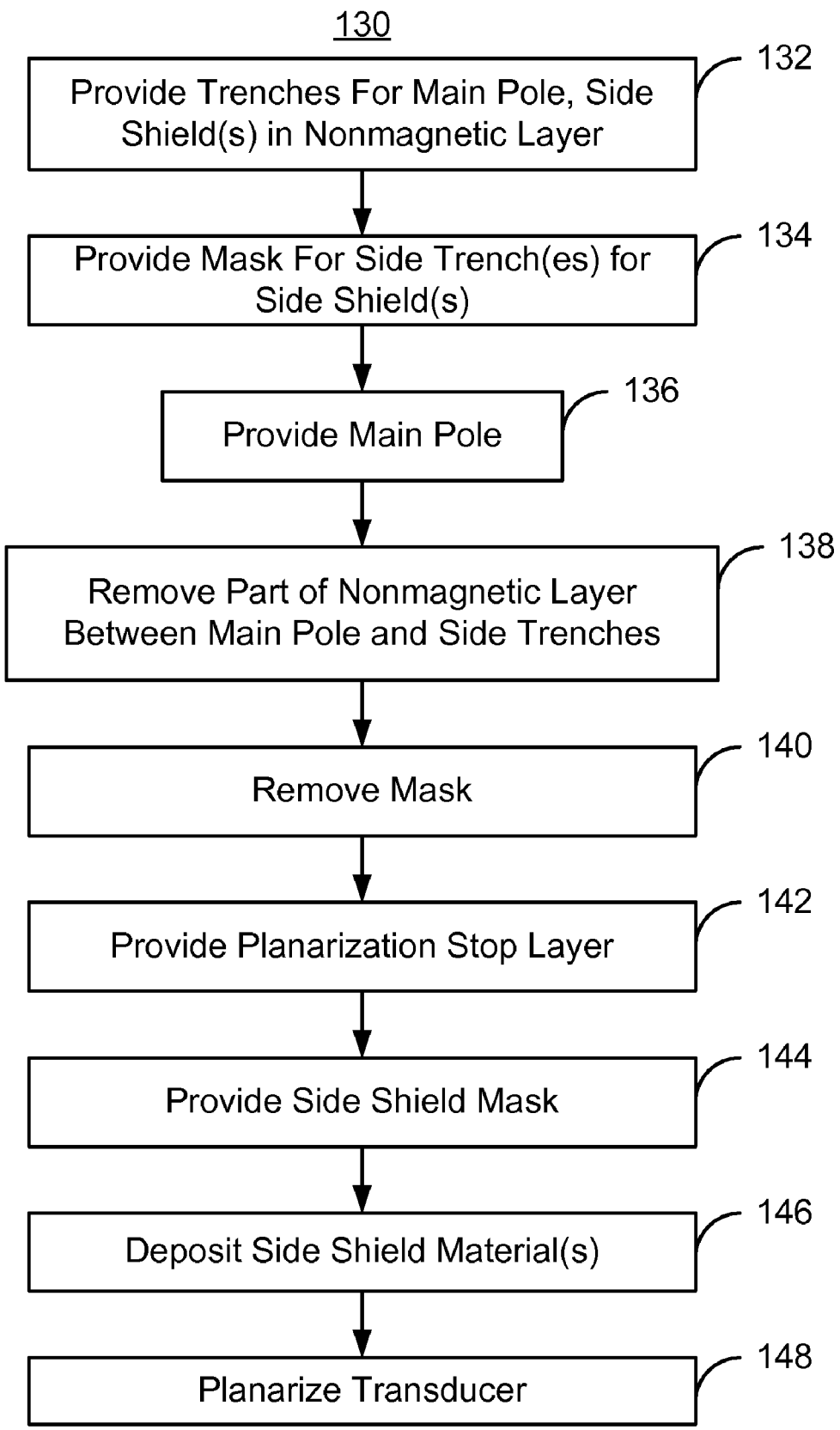
FIG. 6 is a flow chart depicting another exemplary embodiment of a method for fabricating a magnetic recording transducer having side shields.

FIG. 6 is a flow chart depicting another exemplary embodiment of a method 150 for fabricating a magnetic recording transducer having side shields. For simplicity, some steps may be omitted. FIGS. 7-27 depict exemplary embodiments of a magnetic recording transducer 200 during fabrication. The method 150 is described in the context of the transducers 200. The magnetic transducer 200 is not drawn to scale. Further, only certain components are shown. The method 150 is also described in the context of providing a single recording transducer. However, the method 150 may be used to fabricate multiple transducers and/or multiple poles at substantially the same time. The method 150 is also described in the context of particular layers. A particular layer may include multiple materials and/or multiple sublayers. The method 150 also may start after formation of other portions of the magnetic recording transducer. For example, the method 150 commences after formation of an underlayer and a nonmagnetic layer on the underlayer. The underlayer is nonmagnetic and may be an RIE stop layer. In one embodiment, the nonmagnetic layer is an insulator, such as aluminum oxide.

Figure 7:
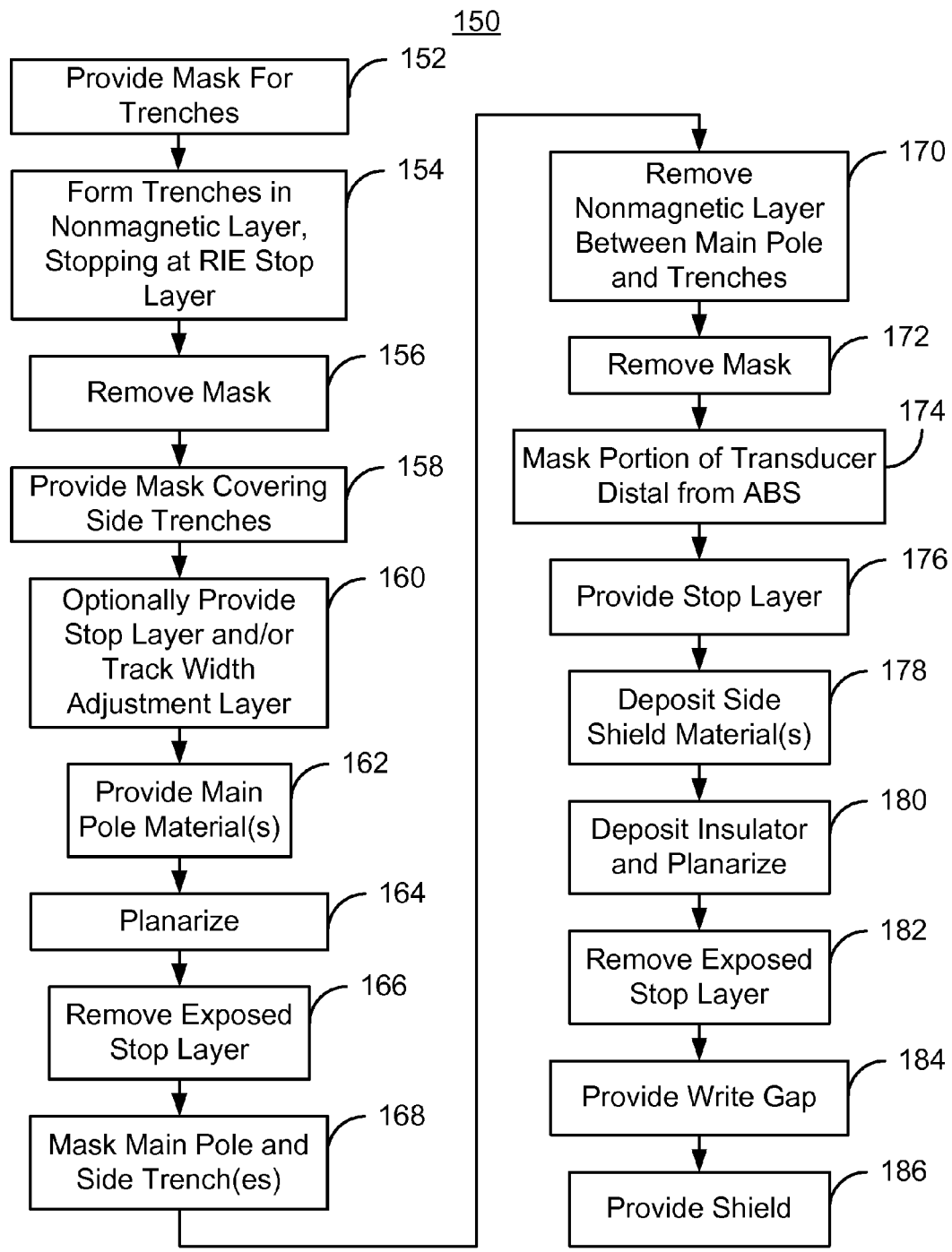
FIG. 7 is a flow chart depicting another exemplary embodiment of a method for fabricating a magnetic recording transducer having side shields.

A mask is provided on the nonmagnetic layer, via step 152. The mask may be a photoresist mask with a pattern for trenches to be provided in the nonmagnetic layer. FIG. 7 depicts the magnetic transducer 200 after step 152 is provided. The underlayer 202 and nonmagnetic layer 204 are shown. The underlayer 202 may include Ru and is an etch stop layer. The nonmagnetic layer 204 may include aluminum oxide. The mask 206 includes apertures 208 corresponding to the locations at which trenches are to be formed.

Trenches are provided in the nonmagnetic layer, via step 154. FIG. 8 depicts ABS and plan view of the transducer 200. Three trenches, a central trench 210 and side trenches 212, are provided at the ABS location. The first, central trench 210 corresponds to the main pole that is to be formed. Two side trenches 214 correspond to the side shields being provided. In one embodiment, the outer sides of the side trenches 212 mark the locations of the outer edges of the side shields to be formed. Trenches 210 and 212 are formed in the nonmagnetic layer 204 using an aluminum oxide RIE. In such an embodiment, the underlayer 202 may form the bottom of the trenches 210 and 212. As can be seen in the plan view shown in FIG. 8, the trenches 210 and 212 are connected and surround a portion of the nonmagnetic layer 204.

The mask 206 used to form the trenches 210 and 212 may then be removed, via step 156. FIG. 9 depicts the transducer 200 after the mask 206 has been stripped. Consequently, the underlayer 202, nonmagnetic layer 204, and trenches 210 and 212 remain.

Figure 10:
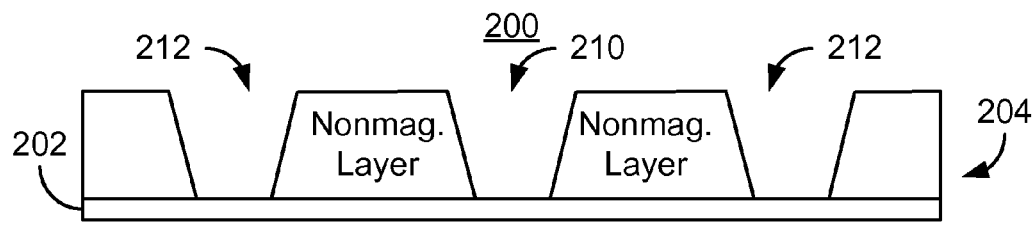

Another mask is provided in step 158. In one embodiment, step 158 includes providing a photoresist mask that is patterned and cured. The mask may be a photoresist mask. FIG. 10 depicts an ABS view of the transducer 200 after step 158 is performed. Thus, the mask 214 covering trenches 212 is shown. The mask 214 preserves the location and shape of the side trenches 212.

Figure 11:
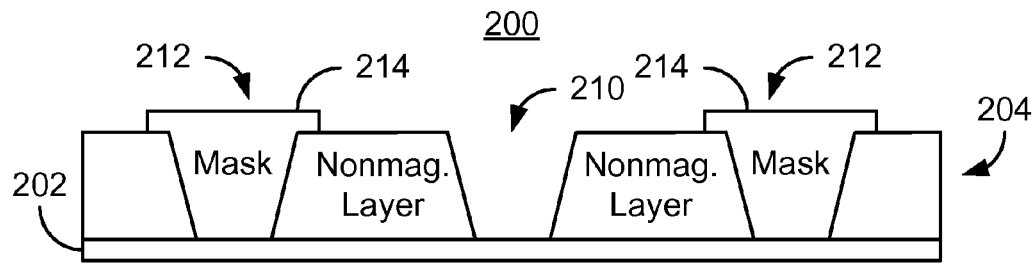

Nonmagnetic layer(s) are provided, via step 160. The nonmagnetic material(s) may include layer(s) used to adjust the track width of the main pole and/or planarization stop layer (s). FIG. 11 depicts the magnetic transducer after step 160 is performed. Thus, a planarization stop layer 216 and track width adjustment layer 218 are shown. Step 160 may include using ALD to provide the track width adjustment layer 218 and depositing a Ru layer as the planarization stop layer 216. In one embodiment, the planarization stop layer 216 may double as the track width adjustment layer.

Figure 12:
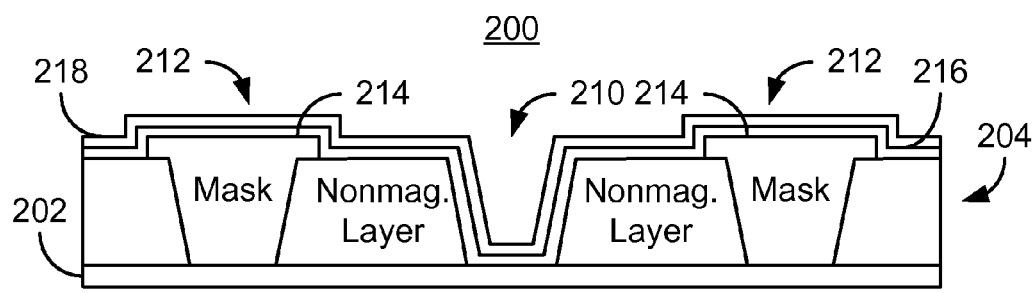

A main pole material(s) are provided, via step 162. Step 162 may include plating magnetic materials. In addition, a seed layer might be provided. FIG. 12 depicts the transducer 200 after step 162 is provided. Magnetic material(s) 220 are thus shown. In one embodiment, at least a portion of the main pole material(s) 220 reside in the trench 210. Thus, at least a portion of the main pole being formed will reside in the first trench 210.

Figure 13:
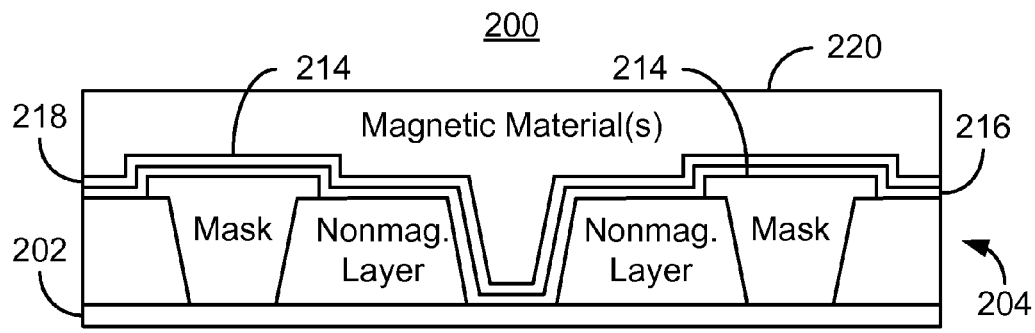

The magnetic material 220 may then be planarized, via step 164. Step 164 may include performing a CMP. FIG. 13 depicts the transducer 200 after step 164 is performed. Thus, a majority of the magnetic material 220 outside of the trench 210 has been removed. In addition, the top surface of the transducer 200 is planarized. Thus, portions of the nonmagnetic layers 216' and 218' and pole 220' remain. In addition, a portion of the mask 214 has been removed, thus, mask 214' remains. The main pole 220' may include one or more bevels. For example, the main pole may include no bevel, a bottom bevel, a top bevel, or both. In such an embodiment, the top bevel may be provided by removing a portion of the magnetic materials in proximity to the ABS. The bottom bevel may be provided by removing a portion of the bottom of the first, central trench formed in step 154 distal from the ABS.

At least a portion of the etch stop layer 216' residing between the trench 212 and the main pole 220' is removed, via step 166. FIG. 14 depicts plan and ABS views of the transducer 200 after step 166 is performed. Thus, the main pole 220" and nonmagnetic layers 216" and 218" and portion of the mask 214" remain.

The main pole 220" and side trenches 212 are masked, via step 168. FIG. 15 depicts the transducer after step 168 is performed. Thus, mask 222 has been provided. The mask 222 covers the mask 214" and the pole 220". For simplicity, the mask 214" is not separately shown in FIG. 15.

The portion of the nonmagnetic layer 204 between the main pole 220'" and the portions of the mask 222 in the trenches 212 is removed, via step 170. In one embodiment, step 170 is accomplished via a wet etch. In such an embodiment, the nonmagnetic layer(s) 216" and 218" in combination with the portion of the mask 222 on the main pole 220" may protect the main pole 220" from the etchant. At least the portion of the mask that covers the side trenches is removed, via step 172. In one embodiment, step 172 includes performing an RIE to remove the photoresist mask 222. Thus, the edges of the nonmagnetic layer that correspond to the outside edges of the side shields are exposed. FIG. 16 depicts ABS and plan views of the transducer 200 after step 170 is performed. Thus, the main pole 220", nonmagnetic layer(s) 216" and 218" and nonmagnetic layer 204 distal from the main pole 220" remain.

The portion of the transducer 200 distal from the ABS is also covered with a side shield mask, via step 174. Step 174 thus includes providing a photoresist mask covering the desired regions of the transducer 200. FIG. 17 depicts one embodiment of the transducer 200 after step 174 is performed. Thus, a side shield mask 224 (shown in dotted lines) distal from the ABS location has been provided. This side shield mask 224 covers the portion of the transducer 200 on which the side shield is not desired to be provided. In the embodiment shown in FIG. 17, the side shield mask 224 has a simple geometry. FIG. 18 depicts ABS and plan view of another embodiment of the transducer 200 after step 174 is performed. Thus, a side shield mask 224' (shown in dotted lines) distal from the ABS location has been provided. This side shield mask 224' also covers the portion of the transducer 200 on which the side shield is not desired to be provided. However, the geometry of the side shield mask 224' is more complex and includes canted corners.

A planarization stop layer is provided, via step 176. In one embodiment, step 176 includes depositing a Ru layer. In such an embodiment, the stop may also function as a seed layer. FIG. 19 depicts the transducer 200 after step 176 is performed. A portion of the planarization stop layer 226 covers the main pole 220", an exposed portion of the underlayer 202, and an exposed portion of the nonmagnetic layer 204.

Figure 21:
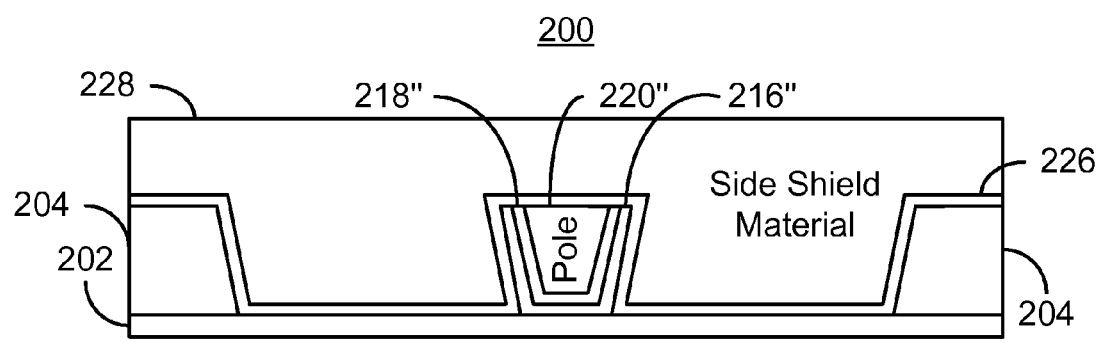

At least one side shield material is then deposited, via step 178. FIG. 20 depicts the transducer 200 after step 178 is performed. Thus, magnetic materials 228 for the side shield are depicted. The magnetic transducer 200 is refilled with a nonmagnetic material and planarized, via step 180. In addition, the nonmagnetic materials provided in step 180 may be the same as for the nonmagnetic layer 204. The planarization performed in step 180 may be CMP. FIG. 21 depicts the transducer 200 after step 180 is performed. The planarization may be terminated before the planarization stop layer 226' is removed. Consequently, the side shields 228' and main pole 220" may be provided.

Figure 22:
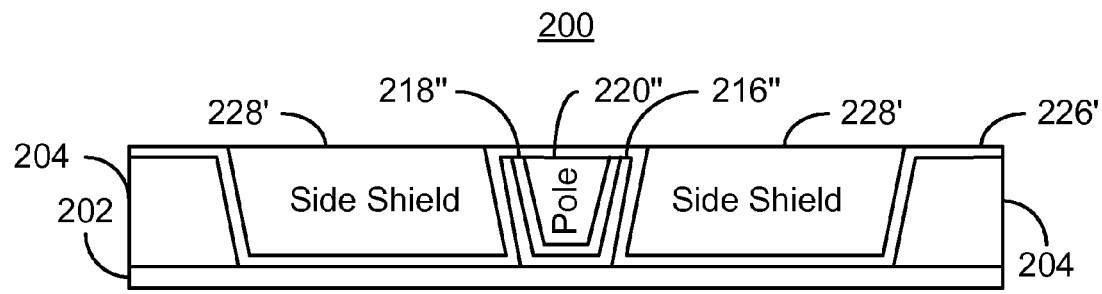
Figure 23:
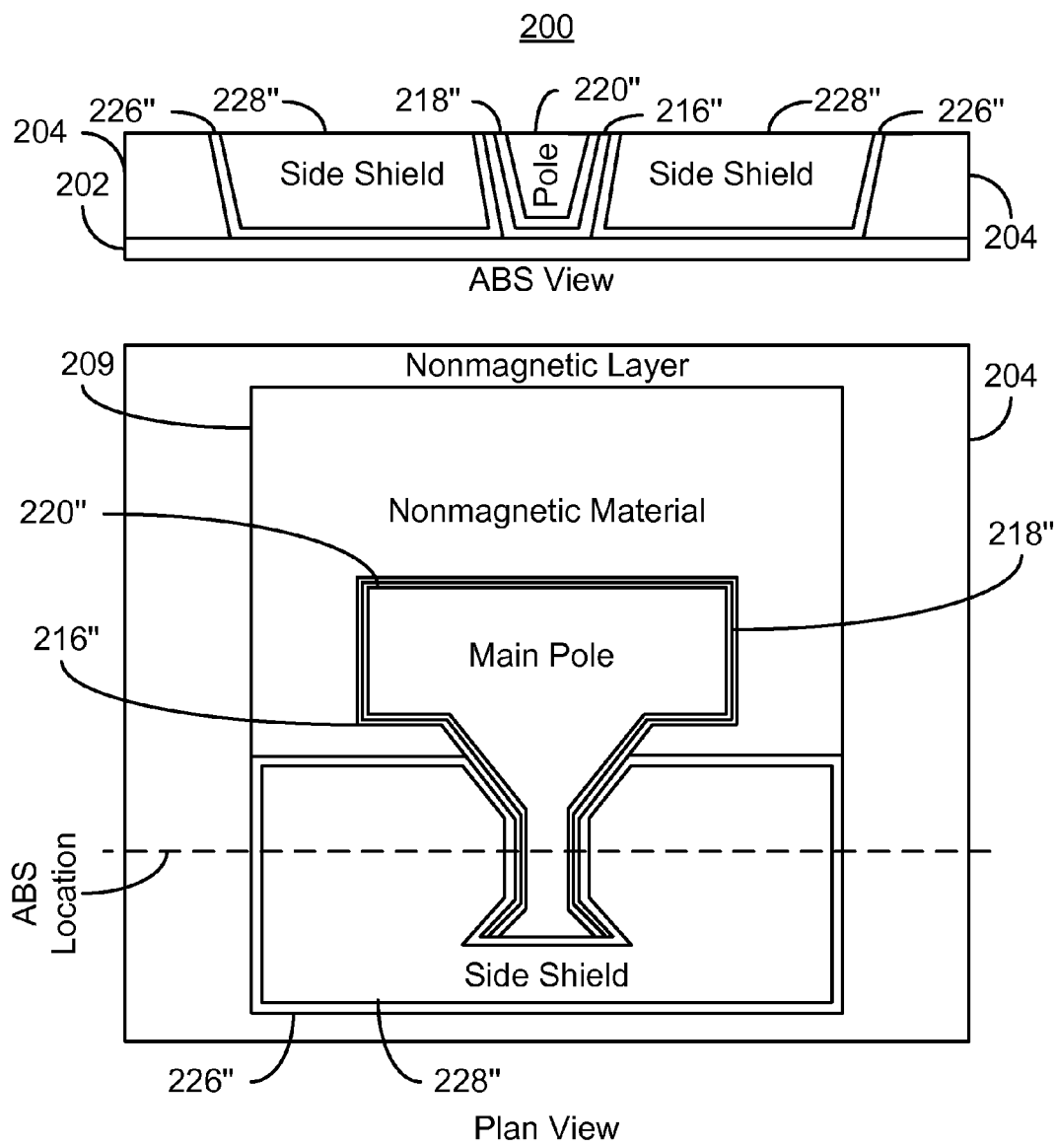

The exposed portion of the stop layer 226 is removed, via step 182. FIG. 22 depicts ABS and plan view of one embodiment of the transducer 200 after step 182 is performed. Thus, only the portions of the stop layer 226" remains. In addition, portions of the side shield 228" and nonmagnetic layers 218" and 216" remain. Also shown is main pole 220". The embodiment depicted in FIG. 22 corresponds to the mask 224. Thus, the geometry of the side shields 228' is relatively simple. FIG. 23 depicts ABS and plan views of another embodiment of the transducer 200. Although the ABS views in FIGS. 22 and 23 are substantially the same, the plan views differ. In particular, the geometry of the side shield 228'" shown in FIG. 23 is more complex. Thus, varying geometries of the side shields 228"/228'" may be provided.

A write gap is provided in step 184. In addition, a top shield may be provided in step 186. FIGS. 24 and 25 depict embodiments of the transducer 200 as seen at the ABS. In the embodiment shown in FIG. 24, the write gap 230 and top shield 232 have been provided. The write gap 230 extends across the main pole 220", but allows the side shields 228" to physically connect with the top shield 232. Consequently, a wrap-around shield is formed. In the embodiment shown in FIG. 25, the write gap 230' extends across the side shields 228". Thus, the side shields 228" are separate from the top shield 232'. In addition, because trenches 210 and 212 for the main pole 220" and side shields are formed together and have the underlayer 202 as the bottom, the bottom of the main pole 220" is generally not lower than the bottom of the side shields 228". For the same reason, the outer edges of the side shields 228" may have substantially the same reverse angle as the main pole 220". Further, in the embodiment shown, the stop layer 226" substantially surrounds the bottom and sides of the side shields 228".

Figure 26:
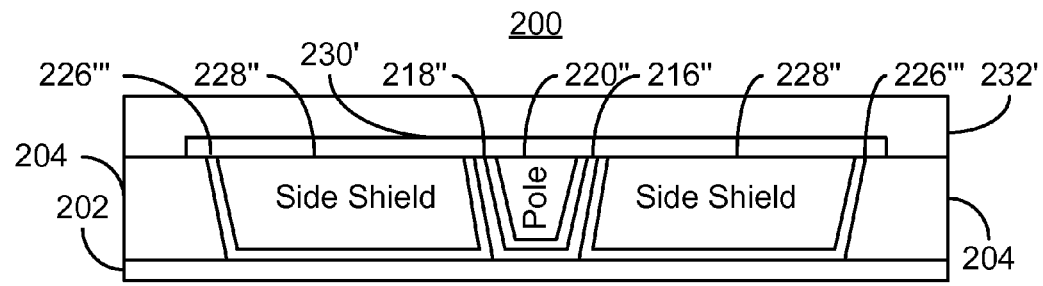
Figure 27:
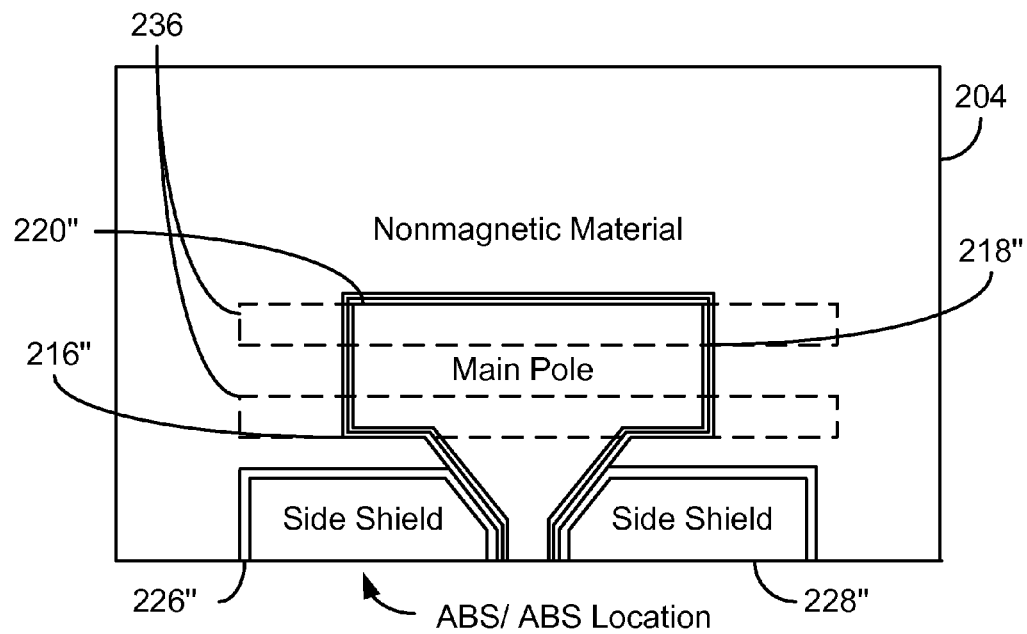
Figure 28:
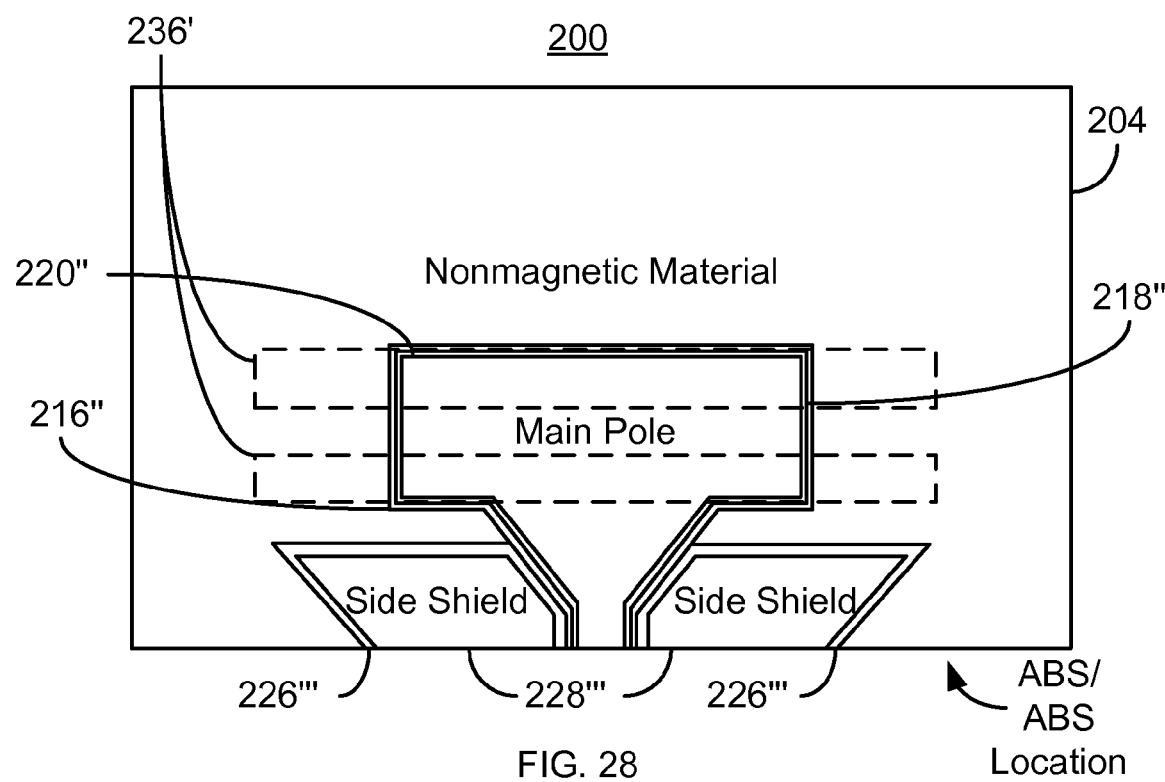

Fabrication of the transducer 200 may then be completed. For example, the transducer 200 may be lapped to the ABS location. In addition, coil(s) may be provided. FIGS. 26-27 depict plan views of two embodiments of the transducer 200 corresponding to the side shield mask 224 and 224', respectively. In both, coils 236 have been provided and the transducers 200 have been lapped to the ABS.

Using the method 150, transducers 200 may be formed. As a result, side shields 228"/228'" that extend from the ABS to not past the coil 236/236' front location are provided. The geometry of these side shields 228"/228'" may also be separately tailored. Further, because the main pole 220" is formed in a trench in the nonmagnetic materials, fabrication of the transducer 200 is more robust. Consequently, performance and fabrication of the transducer may be improved.

We claim:

1. A method for fabricating a magnetic transducer having an underlayer and a nonmagnetic layer residing on the underlayer, the method comprising:
    providing a plurality of trenches in the nonmagnetic layer before a main pole is formed, a first trench of the plurality of trenches corresponding to the main pole, at least one side trench of the plurality of trenches corresponding to at least one side shield;
    providing a mask covering the at least one side trench;
    providing the main pole, at least a portion of the main pole residing in the first trench;
    removing at least a portion of the nonmagnetic layer residing between the at least one side trench and the main pole; and
    providing at least one side shield, the at least one side shield extending from at least an air-bearing surface (ABS) location to not further than a coil front location.

2. The method of claim 1 wherein the step of removing the at least the portion of the nonmagnetic layer further includes:
    wet etching the at least the portion of the nonmagnetic layer.

3. The method of claim 1 wherein the step of providing the main pole further includes:
    providing at least one nonmagnetic layer, a first portion of the at least one nonmagnetic layer residing in the first trench, a second portion of the at least one nonmagnetic layer residing on the mask:
    providing at least one magnetic layer on the at least one nonmagnetic layer; and planarizing at least the at least one magnetic layer.

4. The method of claim 1 wherein the step of providing the main pole further includes:
    providing at least one bevel on the main pole.

5. The method of claim 4 wherein the at least one bevel includes at least one of a top bevel and a bottom bevel.

6. The method of claim 1 further comprising:
    removing the mask prior to formation of the at least one side shield.

7. The method of claim 6 wherein the step of providing the at least one side shield further includes:
    providing a side shield mask, the side shield mask extending from at least the coil front location distal from the ABS location;
    depositing at least one side shield material; and
    planarizing the at least one side shield material, thereby removing a portion of the at least one side shield material.

8. The method of claim 7 wherein the step of providing the at least one side shield further includes:
    depositing a planarization stop layer before the at least one side shield material is deposited; and
    removing an exposed portion of the planarization stop layer after the step of planarizing the at least one side shield material.

9. The method of claim 1 further comprising:
    providing a write gap, at least a portion of the write gap residing on the main pole; and
    providing a top shield, at least a portion of the top shield residing on the main pole.

10. The method of claim 1 wherein the plurality of trenches are formed substantially simultaneously.

11. A method for fabricating a magnetic transducer having an underlayer and a nonmagnetic layer residing on the underlayer, the method comprising:
    providing a plurality of trenches in the nonmagnetic layer, a first trench of the plurality of trenches corresponding to a main pole, at least one side trench of the plurality of trenches corresponding to at least one side shield;
    providing a mask covering the at least one side trench;
    providing the main pole, at least a portion of the main pole residing in the first trench, the step of providing the main pole further including
        providing at least one nonmagnetic layer, a first portion of the at least one nonmagnetic layer residing in the first trench, a second portion of the at least one nonmagnetic layer residing on the mask:
        providing at least one magnetic layer on the at least one nonmagnetic layer, wherein the step of providing the at least one nonmagnetic layer further includes
            depositing a planarization stop layer, a first portion of the planarization stop layer residing in the first trench, a second portion of the planarization stop layer residing on the mask; and
            depositing a nonmagnetic track width adjustment layer on the planarization stop layer; and
        planarizing the at least one magnetic layer
    removing at least a portion of the nonmagnetic layer residing between the at least one side trench and the main pole; and
    providing at least one side shield, the at least one side shield extending from at least an air-bearing surface (ABS) location to not further than a coil front location.

12. A method for fabricating a magnetic transducer having an underlayer and a nonmagnetic layer residing on the underlayer, the method comprising:
    providing a plurality of trenches in the nonmagnetic layer, a first trench of the plurality of trenches corresponding to a main pole, at least one side trench of the plurality of trenches corresponding to at least one side shield;
    providing a mask covering the at least one side trench;
    providing the main pole, at least a portion of the main pole residing in the first trench, the step of providing the main pole further including
        providing at least one nonmagnetic layer, a first portion of the at least one nonmagnetic layer residing in the first trench, a second portion of the at least one nonmagnetic layer residing on the mask, wherein the step of providing the at least one nonmagnetic layer further includes:
            depositing a nonmagnetic track width adjustment layer:
        providing at least one magnetic layer on the at least one nonmagnetic layer;
    removing at least a portion of the nonmagnetic layer residing between the at least one side trench and the main pole; and
    providing at least one side shield, the at least one side shield extending from at least an air-bearing surface (ABS) location to not further than a coil front location.

13. A method for fabricating a magnetic transducer having an underlayer and a nonmagnetic layer residing on the underlayer, the method comprising:
    providing a plurality of trenches in the nonmagnetic layer, a first trench of the plurality of trenches corresponding to a main pole, at least one side trench of the plurality of trenches corresponding to at least one side shield;

providing a mask covering the at least one side trench;

providing the main pole, at least a portion of the main pole residing in the first trench;

removing at least a portion of the nonmagnetic layer residing between the at least one side trench and the main pole;

removing the mask prior to formation of the at least one side shield; and providing at least one side shield, the at least one side shield extending from at least an air-bearing surface (ABS) location to not further than a coil front location, the step of providing the at least one side shield further including providing a side shield mask, the side shield mask extending from at least the coil front location distal from the ABS location, wherein the side shield mask has an edge proximate to the main pole and a rear edge distal from the ABS, and wherein the step of providing the side shield mask further includes:

forming at least one canted corner between the edge and the rear edge such that the at least one side shield includes the at least one canted corner between a side edge proximate to the main pole and a side shield rear edge;

depositing at least one side shield material; and planarizing the at least one side shield material, thereby removing a portion of the at least one side shield material.

14. A method for fabricating a magnetic transducer having an underlayer and a nonmagnetic layer residing on the underlayer, the method comprising:

providing a plurality of trenches in the nonmagnetic layer, a first trench of the plurality of trenches corresponding to a main pole, at least one side trench of the plurality of trenches corresponding to a side shield, the plurality of trenches being provided before the main pole is provided;

providing a mask before the main pole is provided, at least a portion of the mask covering the at least one side trench;

providing the main pole, at least a portion of the main pole residing in the first trench;

removing a portion of the nonmagnetic layer residing between the at least one side trench and the main pole;

removing the at least the portion of the mask;

providing a planarization stop layer;

providing a side shield mask, the side shield mask extending from at least a coil front location distal from an air-bearing surface (ABS) location;

depositing at least one side shield material; and planarizing the at least one side shield material.

15. The method of claim 14 wherein the step of providing the main pole further includes:

depositing at least one nonmagnetic layer, a portion of the at least one nonmagnetic layer residing in the first trench;

depositing a main pole layer, at least a portion of the main pole layer residing in the first trench; and planarizing the main pole layer to form the main pole.

16. The method of claim 14 wherein the plurality of trenches are formed substantially simultaneously.

* * * * *